(12) United States Patent
Godin et al.

(10) Patent No.: US 8,041,899 B2
(45) Date of Patent: Oct. 18, 2011

(54) SYSTEM AND METHOD FOR FETCHING INFORMATION TO A CACHE MODULE USING A WRITE BACK ALLOCATE ALGORITHM

(75) Inventors: Kostantin Godin, Hertzelia (IL); Roman Landa, Kyryat Ono (IL); Itay Peled, Hod-Hasharon (IL); Yakov Tokar, Ashod (IL); Ziv Zamsky, Raanana (IL)

(73) Assignee: Freescale Semiconductor, Inc., Austin, TX (US)

( * ) Notice: Subject to any disclaimer, the term of this patent is extended or adjusted under 35 U.S.C. 154(b) by 584 days.

(21) Appl. No.: 12/181,701

(22) Filed: Jul. 29, 2008

(65) Prior Publication Data

US 2010/0030974 A1 Feb. 4, 2010

(51) Int. Cl.
*G06F 12/00* (2006.01)
*G06F 12/08* (2006.01)

(52) U.S. Cl. . 711/143; 711/141; 711/146; 711/E12.001; 711/E12.017; 711/E12.026

(58) Field of Classification Search .................. 711/143, 711/141, 146, E12.001, E12.017, E12.026
See application file for complete search history.

(56) References Cited

U.S. PATENT DOCUMENTS

| | | | |
|---|---|---|---|
| 5,224,214 A | 6/1993 | Rosich | |
| 5,802,559 A | 9/1998 | Bailey | |
| 5,809,530 A | 9/1998 | Samra et al. | |
| 5,920,889 A | 7/1999 | Petrick et al. | |
| 6,769,052 B2 | 7/2004 | Chauvel et al. | |
| 6,925,515 B2 | 8/2005 | Burns et al. | |
| 2002/0087801 A1 | 7/2002 | Bogin et al. | |
| 2002/0112124 A1* | 8/2002 | Arimilli et al. | 711/122 |
| 2003/0028695 A1 | 2/2003 | Burns et al. | |
| 2005/0071601 A1 | 3/2005 | Luick | |
| 2005/0223165 A1 | 10/2005 | Schmidt et al. | |
| 2006/0059316 A1 | 3/2006 | Asher et al. | |
| 2008/0086596 A1* | 4/2008 | Davis et al. | 711/125 |

OTHER PUBLICATIONS

PCT Application No. PCT/US2009/042021; Search Report and Written Opinion mailed Dec. 17, 2009.

* cited by examiner

*Primary Examiner* — Yong Choe

(57) ABSTRACT

A write back allocate system that includes: (i) a store request circuit; (ii) a processor, adapted to generate a store request that comprises an information unit and an information unit address; and (iii) a cache module, connected to the store request circuit and to a high level memory unit. A single cache module line includes multiple segments, each segment is adapted to store a single information unit. A content of a cache module line is retrieved from the high level memory unit by generating a fetch burst that includes multiple segment fetch operations. The store request circuit includes a snooper and a controller. The snooper detects a portion of an address of a cache segment of a cache line that is being fetched during a fetch burst. The controller is adapted to request from the cache module to receive the information unit before a completion of the fetch burst if the portion of the address of the cache segment matches a corresponding portion of the information unit address.

19 Claims, 2 Drawing Sheets

SYSTEM AND METHOD FOR FETCHING INFORMATION TO A CACHE MODULE USING A WRITE BACK ALLOCATE ALGORITHM

FIELD OF THE INVENTION

The present invention relates to methods and systems for fetching information to a cache module using a write back allocate algorithm.

BACKGROUND OF THE INVENTION

Cache modules are high-speed memories that facilitate fast retrieval of information including data and instructions. Typically, cache modules are relatively expensive and are characterized by a small size, especially in comparison to high-level memory modules.

The performance of modern processor-based systems usually depends upon the performance of the cache module and especially to a relationship between cache module hits and cache module misses.

Various cache module modules and processor architectures, as well as data retrieval schemes, were developed over the years, to meet increasing performance demands. These architectures included multi-port cache modules, multi-level cache module architecture, super scalar type processors and the like.

Processors are capable of requesting information from a cache module and, alternatively or additionally, from another memory module that can be a high-level memory module. The high-level memory module can also be a cache module memory, another internal memory and even an external memory.

There are various manners to write information into a cache module or a high-level memory module. Write-back involves writing one or more information units to the cache module. The cache module sends one or more information units to the high-level memory once that one or more information units are removed from the cache module. The latter operation is also known in the art as flushing the cache modules. Write-back allocate involves writing the information unit to the cache only if the address of the information unit is present in the cache. If it is not present then the processor can be stalled until the entire cache line that includes that address of the information unit is fetched.

The cache module includes multiple lines that in turn are partitioned to segments. Each segment is associated with a validity bit and a dirty bit. A valid bit indicates whether a certain segment includes valid information. The dirty bit indicates if the segment includes a valid information unit that was previously updated but not sent to the high-level memory module. If a write back policy is implemented only the segments that are associated with an asserted dirty bit are written to the high-level memory module.

There is a need to provide an efficient method and apparatus for fetching information to a cache module.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF PREFERRED EMBODIMENTS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Figure 1:
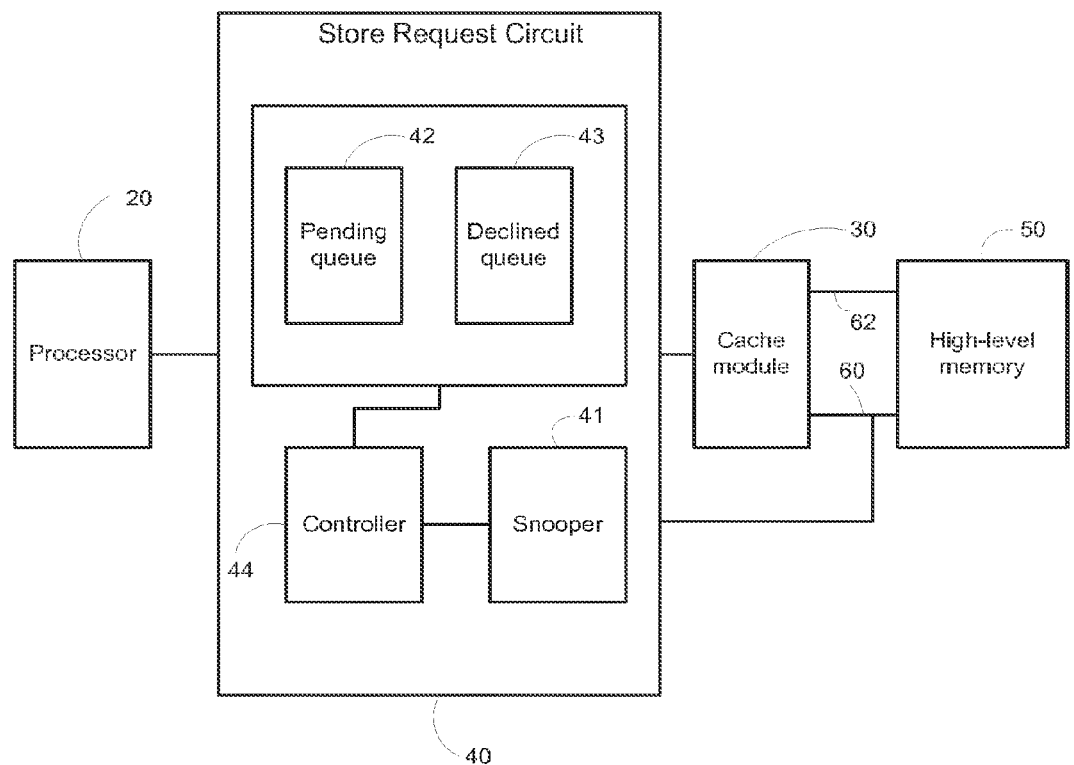
FIG. 1 schematically shows an example of an embodiment of a write back allocate system.

FIG. 1 schematically shows an example of an embodiment of a write back allocate system 10.

System 10 includes processor 20, cache module 30, and store request circuit 40. It can include high-level memory 50 or be connected to such a high-level memory.

Store request circuit 40 includes snooper 41, at least one store request buffer (such as pending buffer 42 and declined buffer 43) and controller 44.

Processor 20 is connected to store request circuit 40. Store request circuit 40 is connected to cache module 30. Cache module 30 is connected via address bus 60 and data bus 62 to high level memory 50. Controller 44 of store request circuit 40 can send store requests to cache module 30 and can receive cache module responses.

Processor 20 can generate one or more store requests. A store request can include an information unit and an information unit address. The information unit should be written to the high level memory (such as but not limited to high level memory 50). The information unit address can be a physical address or a virtual address. Conversions between physical and virtual address units can be executed by processor 20, by a load/store unit (not shown) or even by store request circuit 40.

Store request circuit 40 can temporarily store the store requests until cache module 30 receives them. Store request circuit 40 can store multiple store requests. It reduces and even eliminates processor 20 freezing periods by receiving store requests from processor 20. Processor 20 can be frozen if it can not send a store request to store request circuit 40—for example, if store request circuit 40 is full.

Cache module 30 is connected to store request circuit 40 and to high level memory unit 50. It (or another circuit connected to it) fetches cache lines from high level memory unit 50 by executing fetch bursts. Each fetch burst includes multiple segment fetch operations—each includes fetching a segment of the cache line. Each cache line includes multiple segments. Each segment can store a single information unit. The number of cache segments per cache line is usually a power of two. Typical values are eight segments per cache line or sixteen segments per cache line.

The fetch burst is time consuming. Stalling a provision (to cache module 30) of a store request till a completion of the entire fetch burst can decrease the effectiveness of the write process and can have a negative impact on processor 20. By allowing a store request to be written to cache module 30 before a completion of the entire cache burst the store request circuit 40 can be emptied much faster and can receive new store requests from processor 20.

Controller 44 can communicate with cache module 30 and with snooper 41 in order to determine when to ask cache module 30 to receive a store request. It can re-send a previously declined store request, even before a completion of a fetch burst if the portion of the address of the cache segment matches a corresponding portion of the information unit address.

Snooper 41 detects only a portion of an address of a cache segment of a cache line that is being fetched during a fetch burst. The address of the cache segment can include a cache line address (usually the most significant bits of the address of the cache segment) and a cache segment indicator (usually the least significant bits of the address of the cache segment). Snooper 41 can detect the cache segment indicator while ignore the cache line address. Due to the detection of only a portion of the entire cache segment address controller 44 can not be sure that the information unit address really resides in cache module 30 and has to validate the presence of the information unit address in cache module 30 before sending the store request to cache module 30. Nevertheless, this validation can occur before the fetch burst of the entire cache line is completed.

The monitoring of cache address lines (in order to detect a portion of the address of cache segments that are being fetched) simplifies the snooping and saves semiconductor area.

Thus, controller 44 can request cache module 30 to receive a previously declined store request if a detected portion of a cache segment address matches a corresponding portion of the information unit address. Conveniently, the request to receive a previously declined store request can be generated if one or more conditions are fulfilled. For example, such a condition can include detecting that the data and address cache module buses are idle.

Conveniently, snooper 41 snoops address lines (such as address lines $60(0)$-$60(k)$) that convey a cache segment indicator that indicates which segment of a cache line is being fetched during a segment fetch operation. Index k is a positive integer.

Conveniently, there are $2^{(k+1)}$ segments per cache line and address lines $60(0)$-$60(k)$ convey a portion of a fetched cache line address that indicates which segment is being fetched. Accordingly, this portion is a fetched cache segment indicator. This is illustrated by cache line 31 that includes segments $31(1)$-$31(J)$, wherein $J=2^{(k+1)}$.

Snooping fetched cache segment module addresses can enable re-using existing snoopers of legacy systems as well as legacy cache modules that can be unaware of the snooping process.

Controller 44 can communicate with cache module 30 to determine which store requests can be sent to cache module 30. It also controls a transfer of store requests from pending buffer 42 to declined buffer 43. Controller 44 can send one or more cache store requests to cache module 30 per each store request that is stored in store request circuit 40 and is waiting to be sent to cache module 30.

A first cache store request can be sent when the store request is received from processor 20 or if controller 44 determines that it should process that store request. If cache module 30 declines the request (for example, if the information unit address is not present in cache module 30) the declined request can be sent to declined buffer 43 and controller 44 can send another cache store request.

After a predetermined time period controller 44 can issue another cache store request on behalf of a declined store request. Additionally or alternatively, controller 44 can generate a cache store request only to a store request that is stored at the head of declined buffer 43. Declined buffer 43 and pending buffer 42 can be managed as queues but this is not necessarily so.

Controller 44 can send to cache module 30 multiple cache store requests before receiving a response from cache module 30. The number of pending cache store requests can be limited by the capacity of declined buffer 43.

Controller 44 can send a store request to cache module 30 in response to information obtained from snooper 41. Because snooper 41 snoops only a portion of the address bus between cache module 30 and high level memory 50 then controller 44 does not send a store request to cache module 30 until after validating that the information unit address of the store request (that was previously declined and is now stored in declined buffer 43) resides in cache module 30.

Controller 44, and additionally or alternatively, declined buffer 43 can send to snooper 41 cache segment indicators that are stored in it. Snooper 41 is aware of the pending store requests and tries to detect them. Conveniently, a store request that is stored in declined buffer 43 is sent to cache module 30 from declined buffer 43.

Conveniently, controller 44 has an arbitrator per buffer, but this is not necessarily so. An arbitrator of pending buffer 41 can determine which store request should be sent to cache module 30.

Controller 44 can execute at least one of the following operations or a combination thereof: (i) request from cache module 30 to receive, before the completion of the fetch burst, each store request that is stored in the store request module that has an information unit address portion that matches the portion of the address of the cache segment; (ii) request from cache 30 module to receive, before the completion of the fetch burst, each head of buffer store request (such as a head of pending buffer write request or a head of declined buffer write request) that has an information unit address portion that matches the portion of the address of the cache segment. These requests are examples of a cache store request.

If snooper 41 detects a cache segment indicator (that indicates which segment of the cache line is being fetched) that matches an information unit address portion that is stored at the head of a buffer then controller 44 can request from the cache module to receive, before the completion of the fetch burst, that head of buffer store request. This buffer can be declined buffer 43 or pending buffer 41.

According to another embodiment of the invention snooper 41 receives the cache segment indicator (or another portion of the information unit address) of each store request that is sent to either one of declined buffer 43 and pending buffer 42. Snooper 41 searches for matching cache segment indicators. The search can take into account the order of arrival of these store requests, can be indifferent to the order of arrival of the store requests, can be responsive to a priority between these buffers, and the like.

It is noted that system 10 can include a folding circuit (not shown). The folding circuit can determine that a newly received store request is related to the same cache line as a previously received store request. In this case there is no need to initiate two separate fetch bursts. Nevertheless, if the store requests are associated with different segments of the same cache line they should be both stored in store request circuit 40 until they can be sent to cache module 30.

Figure 2:
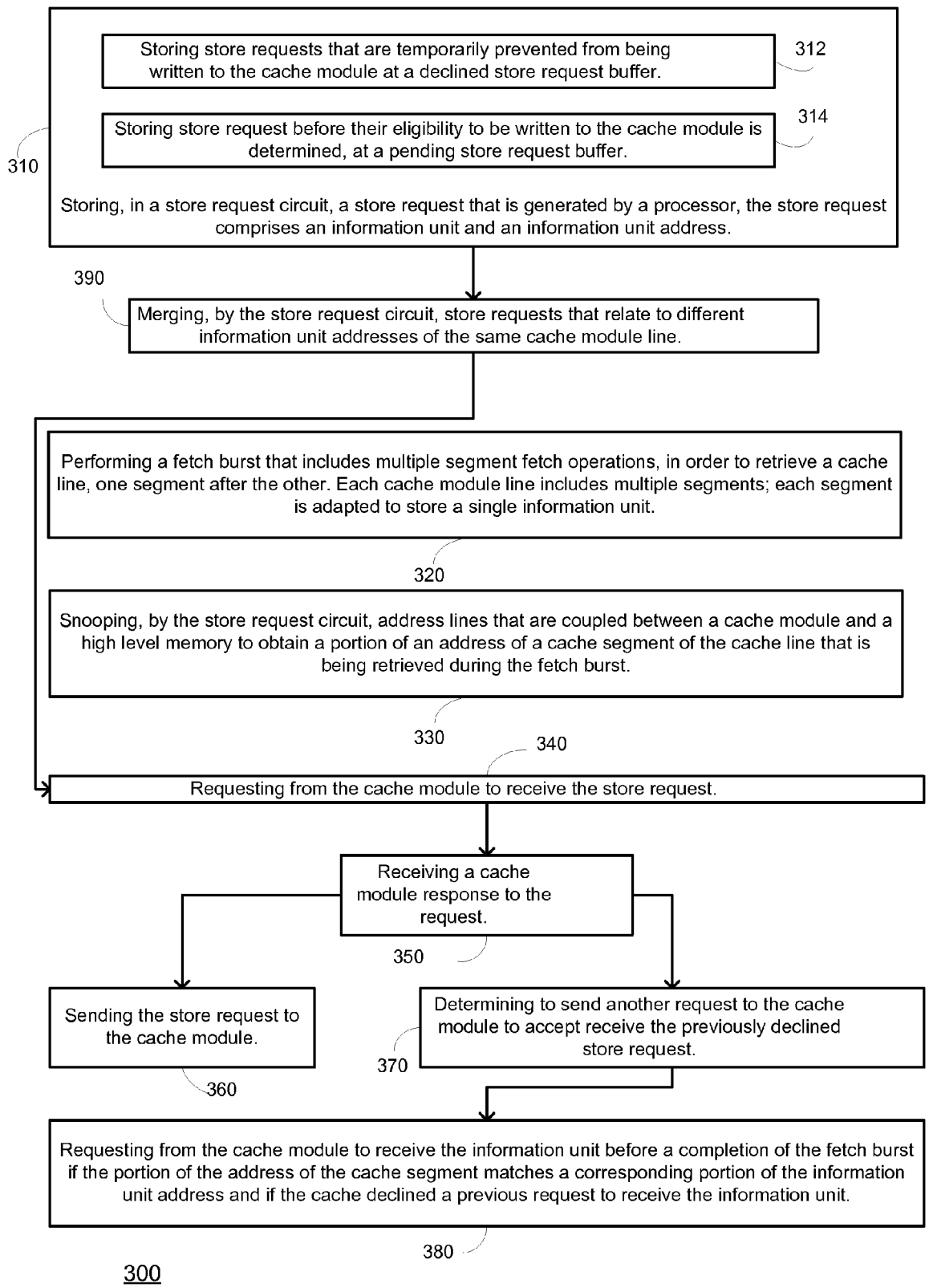
FIG. 2 schematically shows an example of an embodiment of a method.

FIG. 2 schematically shows an example of an embodiment of a method 300 for writing information units to a cache module.

Method 300 starts by stages 310, 320 and 330.

Stage 310 includes storing, in a store request circuit, a store request that is generated by a processor. The store request includes an information unit and an information unit address. Stage 310 can include sending to a snooper information unit addresses (or portions of information unit addresses) of the received store request.

Stage 310 can include stages 312 and 314. Stage 312 includes storing store requests that are temporarily prevented from being written to the cache module at a declined store request buffer. Stage 314 includes storing store requests before their eligibility to be written to the cache module is determined, at a pending store request buffer.

Stage 320 includes performing a fetch burst that includes multiple segment fetch operations, in order to retrieve a cache line, one segment after the other. Each cache module line includes multiple segments, each segment is adapted to store a single information unit.

Stage 330 includes snooping, by the store request circuit, address lines that are coupled between a cache module and a high level memory to obtain a portion of addresses of cache segments of the cache line that are being retrieved during the fetch burst.

Stage 330 can include snooping address lines that convey a cache segment indicator that indicates which segment of the cache line is being fetched.

Stage 330 can include snooping address lines that are coupled between a cache module and a high level memory in order to detect portions of addresses that match those of the received store requests.

The fetching and the snooping are repeated as long as there is a need to fetch cache lines from a high level memory unit to a cache module. Accordingly, stages 320 and 330 are followed by themselves.

Stage 310 is followed by stage 340 of requesting from the cache module to receive the store request.

Stage 340 is followed by stage 350 of receiving a cache module response to the request. The cache module can accept to receive the store request or refuse to receive the store request. If the cache module accepts the request then stage 350 is followed by stage 360, else it is followed by stage 370.

Stage 360 includes sending the store request to the cache module.

Stage 370 includes determining to send another request to the cache module to accept and receive a previously declined store request. Stage 370 can include determining to send another request to the cache module if the portion of the address of the cache segment that is snooped during stage 320 matches a corresponding portion of the information unit address.

Stage 370 can include determining to generate such a request before a completion of a fetch burst that fetches a cache line that includes the cache segment.

Stage 370 can include sending the declined store request to a declined buffer.

Stage 370 can include detecting that one or more condition for sending, to the cache module, another request (to accept a previously declined store request) is fulfilled. For example, such a condition can include detecting that the data and address cache module buses are idle.

Stage 370 is followed by stage 380 of requesting from the cache module to receive the information unit before a completion of the fetch burst if the portion of the address of the cache segment matches a corresponding portion of the information unit address and if the cache declined a previous request to receive the information unit.

Method 300 can further include stage 390 of merging, by the store request circuit, store requests that relate to different information unit addresses of the same cache module line. Stage 390 can follow stage 310 and precede stage 340.

Stage 330 can include at least one of the following: (i) requesting from the cache module to receive, before the completion of the fetch burst, each store request that is stored in the store request module that has an information unit address portion that matches the portion of the address of the cache segment; and (ii) requesting from the cache module to receive, before the completion of the fetch burst, each head of buffer store request that has an information unit address portion that matches the portion of the address of the cache segment.

If stage 320 includes detecting a cache segment indicator that indicates which segment of the cache line is being fetched then stage 330 can include requesting from the cache module to receive, before the completion of the fetch burst, each head of buffer store request that has an information unit address portion that matches the cache segment indicator.

If stage 320 includes detecting a cache segment indicator that indicates which segment of the cache line is being fetched then stage 330 can include requesting from the cache module to receive, before the completion of the fetch burst, a head of pending buffer store request that has an information unit address portion that matches the cache segment indicator.

If stage 320 includes detecting a cache segment indicator that indicates which segment of the cache line is being fetched then stage 330 can include requesting from the cache module to receive, before the completion of the fetch burst, a head of declined buffer store request that has an information unit address portion that matches the cache segment indicator.

Table 1 illustrates various scenarios of an execution of an embodiment of method 300.

TABLE 1

| Time | Information unit address | In cache module | Snooped cache segment indicator | Request cache | Cache module response | Progress of fetch burst |
|---|---|---|---|---|---|---|
| T1 | 0100100011 | Not Known | — | Yes | — | |
| T2 | | No | | | Decline | initiate |
| T3 | | No | 000 | No | | continue |
| T4 | | No | 001 | No | | continue |
| T5 | | No | 010 | No | | continue |
| T6 | | Not known | 010 | Yes | | continue |
| T' | | Yes | | | Accept | Continue |
| T7 | | | 011 | No | | Continue |
| T8 | | | 111 | | | Completed |
| T9 | 0100100001 | Yes | 0001 | Yes | | |
| T10 | 0100100001 | Yes | 0001 | | Accept | |

The first column ("Time") includes points in time.
The second column ("Information unit address") indicates what is the receive information unit address.
The third column ("in cache module ?") indicates whether the write request circuit knows that the information unit address is in the cache module.
The fourth column ("Snooped cache segment indicator") indicates the cache segment indicator that is snooped by snooper 41.
The fifth column ("request cache ?") indicates whether controller 41 requests the cache module to receive the store request.
The sixth column ("Cache module response") indicates whether the cache module accepts the requests (Accept) or declined it (Decline).
The rightmost column ("Progress of fetch burst") indicates the stat of a fetch burst.

Table 1 illustrates a sequence of events that includes sending a first store request (at T1) that includes information unit address 0100100011 (cache line 0100100, cache segment indicator 011). This first store request is declined (at T2) but triggers a burst fetch that includes eight segment fetch operations. The snooper detects (at T') that there is a possibility that the requested cache line segment is fetched before the completion of the fetch burst (at T8) and sends a second store request to the cache (at T') that is responded before the fetch burst is completed. T' is between T6 and T7.

Table 1 also illustrated another sequence of stages that includes sending a first store request (at T9) that includes information unit address 0100100001 (cache line 0100100, cache segment indicator 001). This request is accepted (at T10) because the requested segment already resides in the cache.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A write back allocate system, comprising:
   a store request circuit;
   a processor to generate a store request that comprises an information unit and an information unit address; and
   a cache module, coupled to the store request circuit and to a high level memory unit; wherein a single cache module line comprises multiple segments, each segment to store a single information unit; wherein a content of a cache module line is retrieved from the high level memory unit by generating a fetch burst that comprises multiple segment fetch operations; and
   wherein the store request circuit comprises a snooper and a controller;
   wherein the snooper detects a portion of an address of a cache segment of a cache line that is being fetched during a fetch burst; and
   wherein the controller is to request from the cache module to receive the information unit before a completion of the fetch burst if the portion of the address of the cache segment matches a corresponding portion of the information unit address and if the cache module declined a previous request to receive the information unit.

2. The write back allocate system according to claim 1 wherein the snooper detects a cache segment indicator that indicates which segment of the cache line is being fetched.

3. The write back allocate system according to claim 1 wherein the store request circuit comprises:
   a declined buffer that stores store requests that are temporarily prevented from being written to the cache module; and
   a pending buffer that stores store request before their eligibility to be written to the cache module is determined.

4. The write back allocate system according to claim 1 wherein the controller is to request from the cache module to receive, before the completion of the fetch burst, each store request that is stored in the store request module that has an information unit address portion that matches the portion of the address of the cache segment.

5. The write back allocate system according to claim 1 wherein the controller is to request from the cache module to receive, before the completion of the fetch burst, each head of buffer store request that has an information unit address portion that matches the portion of the address of the cache segment.

6. The write back allocate system according to claim 1 wherein the snooper detects a cache segment indicator that indicates which segment of the cache line is being fetched and wherein the controller is to request from the cache module to receive, before the completion of the fetch burst, each head of buffer store request that has an information unit address portion that matches the cache segment indicator.

7. The write back allocate system according to claim 1 wherein the snooper detects a cache segment indicator that indicates which segment of the cache line is being fetched and wherein the controller is to request from the cache module to receive, before the completion of the fetch burst, a head of pending buffer store request that has an information unit address portion that matches the cache segment indicator.

8. The write back allocate system according to claim 1 wherein the snooper detects a cache segment indicator that indicates which segment of the cache line is being fetched and wherein the controller is to request from the cache module to receive, before the completion of the fetch burst, a head of declined buffer store request that has an information unit address portion that matches the cache segment indicator.

9. The write back allocate system according to claim 1 wherein the controller is to request from the cache module to receive the information unit before the completion of the fetch burst if the portion of the address of the cache segment matches the corresponding portion of the information unit address, if the cache module declined the previous request to receive the information unit and if an address bus and a data bus of the cache module are idle.

10. A method for writing information units to a cache module, the method comprises:
   storing, in an store request circuit, a store request that is generated by a processor, the store request comprises an information unit and an information unit address;
   snooping, by the store request circuit, address lines that are coupled between a cache module and a high level memory to obtain a portion of an address of a cache segment of a cache line that is being retrieved during a burst of segment fetch operations; wherein each cache module line comprises multiple segments, each segment to store a single information unit; and
   requesting from the cache module to receive the information unit before a completion of the fetch burst if the portion of the address of the cache segment matches a corresponding portion of the information unit address and if the cache declined a previous request to receive the information unit.

11. The method according to claim 10 comprising snooping address lines that convey a cache segment indicator that indicates which segment of the cache line is being fetched.

12. The method according to claim 10 comprising:
   storing store requests that are temporarily prevented from being written to the cache module at a declined store request buffer; and
   storing store request before their eligibility to be written to the cache module is determined, at a pending store request buffer.

13. The method according to claim 10 comprising requesting from the cache module to receive, before the completion of the fetch burst, each store request that is stored in the store request module that has an information unit address portion that matches the portion of the address of the cache segment.

14. The method according to claim 10 comprising requesting from the cache module to receive, before the completion of the fetch burst, each head of buffer store request that has an information unit address portion that matches the portion of the address of the cache segment.

15. The method according to claim 10 comprising detecting a cache segment indicator that indicates which segment of the cache line is being fetched and requesting from the cache module to receive, before the completion of the fetch burst, each head of buffer store request that has an information unit address portion that matches the cache segment indicator.

16. The method according to claim 10 comprising detecting a cache segment indicator that indicates which segment of the cache line is being fetched and requesting from the cache module to receive, before the completion of the fetch burst, a head of pending buffer store request that has an information unit address portion that matches the cache segment indicator.

17. The method according to claim 10 comprising detecting a cache segment indicator that indicates which segment of the cache line is being fetched and requesting from the cache module to receive, before the completion of the fetch burst, a head of declined buffer store request that has an information unit address portion that matches the cache segment indicator.

18. The method according to claim 10 comprising requesting from the cache module to receive the information unit before the completion of the fetch burst if the portion of the address of the cache segment matches the corresponding portion of the information unit address, if the cache declined the previous request to receive the information unit and if a cache module address bus and a cache module data bus are idle.

19. The method according to claim 10 comprising sending to a snooper a portion of the information unit address of a received store request circuit.

* * * * *